May 20, 1952  C. L. JASPER  2,597,101
DIRIGIBLE VEHICLE

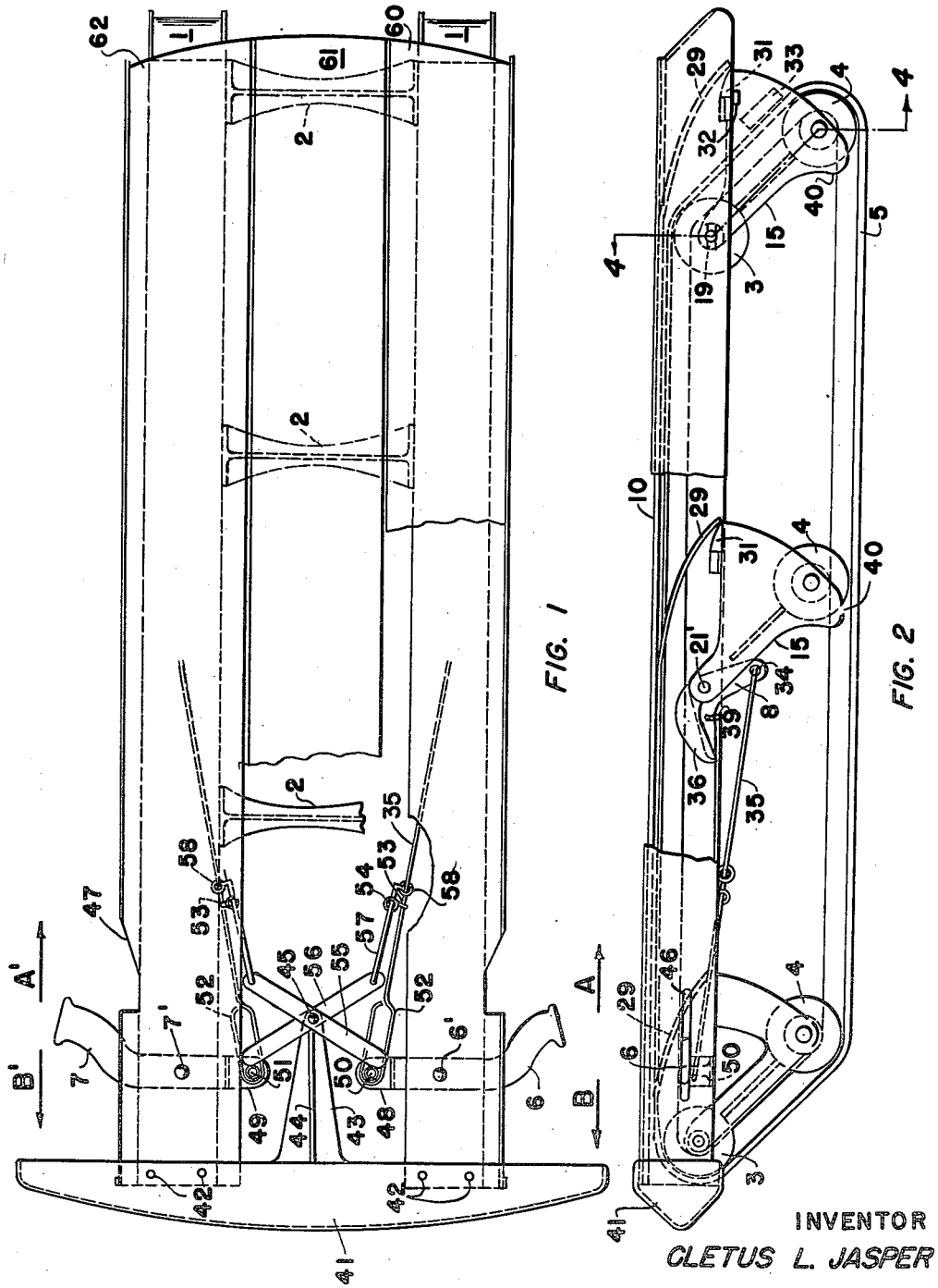

Filed March 17, 1947  2 SHEETS—SHEET 2

INVENTOR
CLETUS L. JASPER

BY Raymond J. Norton
ATTORNEY

Patented May 20, 1952

2,597,101

UNITED STATES PATENT OFFICE 2,597,101

DIRIGIBLE VEHICLE

Cletus L. Jasper, Knoxville, Tenn.

Application March 17, 1947, Serial No. 735,226

1 Claim. (Cl. 280—87.01)

This invention relates to dirigible vehicles, more particularly to an improved vehicle for children.

The vehicles which are now produced for younger children, generally considered, are comprised within two categories, namely, snow vehicles such as the modern rugged sled structures and land vehicles such as bicycles, tricycles, wagons or other such four wheel units. The modern sleds which embody flexible runners to facilitate steering are undoubtedly much more thrilling to children. The modern sled embodying flexible runners which facilitate controlled steering insures young children thrilling and exciting sport. A drawback of the snow sled, as is known, is the fact that once it has attained any considerable speed it is difficult to stop. While these two general types of vehicles have been somewhat improved through the years in such factors as better design and improved esthetic appeal they are each inherently restricted to selected terrain. The snow vehicles, or sleds, present the advantage of exciting speeds with reasonable degree of safety but are, of course, restricted to northern latitudes and generally may be enjoyed only over a brief season. The land vehicles such as wagons, tricycles and the like have a longer seasonal use but are somewhat limited in respect to terrain requiring, for safe enjoyment, relatively smooth surfaces presented by modern pavements.

The purpose of the present invention is to devise a new children's vehicle which combines the advantages of the prolonged or extensive seasonal use of the wheeled vehicles and the characteristically thrilling smooth undulating speed of a snow sled. In addition to providing the riding characteristics of a snow sled the improved vehicle is eminently safer because of the fact that it may not only be more readily directed or steered but may also be completely decelerated or arrested. In view of this, as will be appreciated, the vehicle may be used on hillsides having a steeper grade than would be safe for snow sleds.

As will be seen more fully hereinafter, these novel characteristics are established by providing, so to speak, a land vehicle with a built-in running surface such as a continuous, and preferably a resilient track whereby the vehicle freely moves down inclined surfaces without propulsion and traverses inequalities in terrain, such as minor elevations or depressions, small ditches and the like, with minimum shock to the passenger. As will be seen more fully hereinafter, such a vehicle presents many advantages such as optimum safety, easy dirigibility and quiet smooth operation.

In order to enable a more ready comprehension of the invention a typical illustrative embodiment is shown in the accompanying drawings, in which:

Fig. 1 is a top view of the vehicle partially in plan and partly in section

Fig. 2 is a side view partly in elevation and partly in horizontal section

Figure 3:
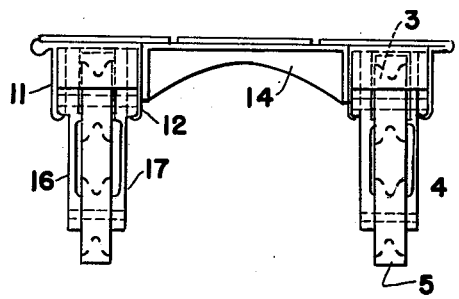
Fig. 3 is a rear elevation of the vehicle

As will be observed from an inspection of the drawings the novel unit comprises essentially a sled type of structure provided with ground-engaging surfaces comprised of endless belts or tracks, or equivalent units, running freely over idler guide rollers. Like the snow sled the vehicle is thus adapted to coast or run on any surface of sufficient inclination or grade and at a speed generally proportional to the grade of the terrain which is traversed. Such a vehicle thus presents the thrilling chracteristics of a sled or toboggan ride but is not limited to use on snow covered surfaces.

With this concept in view it will be appreciated that a vehicle of this general type may be produced with relatively wide variations in design and by utilizing different types of structural material. The particular unit shown in the drawings is given as illustrative of the fundamental principles involved and comprehends such modifications of size, shape and materials of construction as might be deemed desirable by any particular manufacturer.

As shown in the drawings the vehicle comprises essentially a chassis frame including the parallel longitudinal beams 1 and the cross beams 2 which latter are rigidly secured to the longitudinal beams. This frame supports the running gear which consists of a series of upper idler rollers 3 and a series of lower guide rollers 4 which latter are resiliently interconnected or associated with the frame. The continuous ground engaging track 5 passes freely over the guide rollers. The steering mechanism may be of any simple effective type such as the pivoted steering levers 6 and 7 and associated linkage so designed as to independently operate pivoted brake shoes 8 adapted to frictionally engage and retard the tracks 5 on each side of the vehicle.

A desideratum in this type of vehicle is light weight and for this reason the structural elements are preferably fabricated of high strength, light weight materials such as suitable aluminum or magnesium alloys. It will be understood, of course, that, if desired, other materials of construction such as low carbon steel or alloy steels may be utilized for some of the elements of the vehicle.

Considered in more detail the chassis includes the box type beams 1 which preferably are extruded aluminum or magnesium alloys. These beams are formed with the upper flange 10 and the lateral or side parallel flanges 11 and 12, as will be seen hereinafter, directly support the upper idler guide rollers 3 and resiliently support the lower guide rollers 4. As will be observed, the lateral flanges 11 and 12 of the beam 1 are relatively deep. This serves to increase resistance to bending loads and also provides a support and housing for the upper rollers as well as establishing a wide contact or abutment area for the cross beams 2. The upper flange 10 is so shaped on the outside edge as to provide a hand gripping flange continuous along the top edge of the vehicle.

The cross beams are preferably formed with the tapered top flange 13, side flanges 14 and the tapered web 14' to reduce weight and provide a maximum of clearance above the ground. The side flanges are preferably as deep as the contiguous flanges 12 of the horizontal beam 1. The longitudinal and cross beams are suitably secured together to form a strong rigid structure. This may be achieved by bolting, riveting or preferably by welding the units together.

Figure 4:
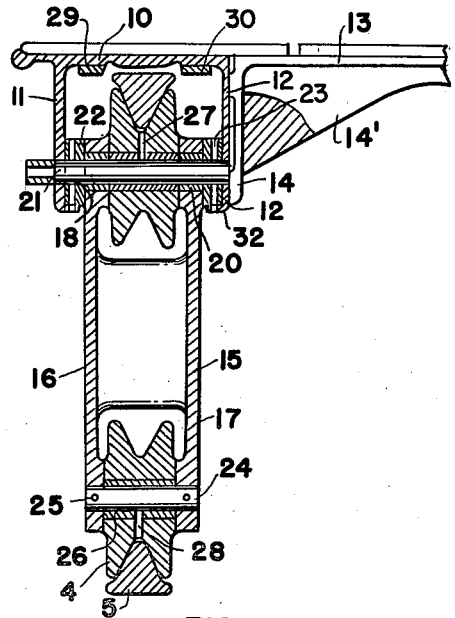
Fig. 4 is an enlarged partial cross-section taken on line 4—4 of Fig. 2
Figure 5:
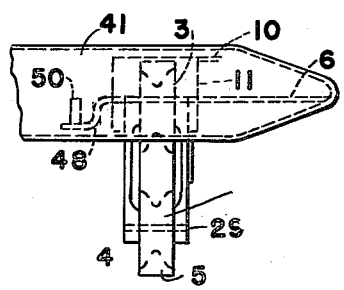
Fig. 5 is a detail of the bumper structure.

As illustrated more particularly in Figs. 2 and 4 the running gear is resiliently connected with the chassis to insure smooth operation and adequate shock absorption. The upper rear roller 3 and its corresponding lower rear roller 4 are mounted in a rugged journal frame member 5. This comprises the connected parallel side or wall members 16 and 17. As will be seen in Fig. 2, the sides of the unit are of sufficient width and are specially designed or conformed so as to provide full safety against accidents caused through a shearing, or scissors, action developed by the proximity with main beam side walls 11 and 12, and a guard over the major portion of the lower guide roller and the section of the belt or track which extends between the two rollers. With this design there is substantially no possibility of a child inserting his fingers in the running gear.

As will be observed, the sides of the upper section of the journal frame are formed with apertures 18 which register with aligned slots 19 in the vertical flanges 11 and 12 of the longitudinal chassis member. The sleeve or bushing 20 is fitted in the aperture 18 and serves to mount the V-shaped upper roller 3. The journal frame and its associated roller 3 is mounted on the chassis frame by means of the axle or stub shaft 21. As shown the stub shaft may be extended and provided with screw threads for the reception of bolts whereby the shaft may be moved and locked in any predetermined position in slot 19, so as to take up the slack or stretch in the track 5 which may occur after some use. The end thrust bearings or washers 22 are preferably inserted between the side walls of the journal member and the adjacent flanges 11 and 12. These thrust rings may be apertured to receive the locking pins 23 to secure the rings to the stub shaft if the shaft, by preference, is cut off flush with flanges 11 and 12.

The lower end of the journal support similarly is apertured to receive the axle 24 which is locked to the journal support in any suitable manner as by the pins 25. The lower roller 4 is mounted on the axle through the medium of the bushing 26. The rollers 3 and 4, as will be noted, are each provided with the oil holes 27 and 28 respectively, to insure proper lubrication of the rollers. It is apparent that, if desired, the sleeve or bushing bearings herein described may be replaced by suitable roller bearing mountings with consequent lower frictional losses and commensurate higher speeds.

As noted previously, shock absorbing means are interposed between the running gear and the chassis. As will be appreciated, this may be of any desired type which is typified herein by the simple form of leaf spring structure shown. As shown in Figs. 2 and 4, the leaf springs 29 and 30 are provided on each side of the upper roller 3. At their forward ends these springs are suitably secured to the under side of the frame member 1. This may be done by bolting each end of the springs to the frame, insertion of the ends of the springs in slots and the like. The rearward portion of these springs, as will be seen from an inspection of Fig. 2, are adapted to contact the journal frame support for free sliding movement thereon. The journal frame is extended in such a way as to serve as a bearing surface for the free ends of the spring. A lug 31 is also provided on the journal frame which serves as a limiting stop to the downward movement of the journal frame and its associated lower roller. For this purpose the lug projects laterally beyond the flanges 16 and 17 and is adapted to abut the beam 1 at a predetermined position in its arc of travel. This may be achieved by providing the chassis frame with an integral or detachable projection 32 adapted to contact the lug 31 when the springs are in the uncompressed or slightly compressed condition. As shown in Fig. 2, the journal frame spring bearing surface formed by the upper surface of lug 31 is a cam or curvilinear surface to reduce frictional resistance to the sliding movement of the springs thereon. This frictional resistance may be diminished further by forming the spring contacting surface of the journal frame, or the complete journal frame of an oil impregnated sintered powdered metal of the oilless bearing type. It will be appreciated at this point also that such type of oilless bearings may be employed in other parts of the structure where simple means to reduce frictional losses are indicated.

If desired, and as is shown in Fig. 2, the vehicle may be provided with means to remove mud or other extraneous matter which tends to adhere to the tracks 5. This may comprise any simple scraper located at any convenient position on the journal frame. In the embodiment shown in the drawings the scraper 33 is secured between the sides 16 and 17 of the journal frame and is spaced slightly from the track so as to continuously remove adhered material during operation of the vehicle.

The rear unit of the running gear, described in detail above, is substantially duplicated at the forward end of the vehicle. In the central position, as will be seen in Fig. 2, the journal frame 15 is mounted. This is a substantial duplicate of the unit at the rear of the vehicle except that the upper guide roller 3 is omitted and the brake unit 8 is mounted in its place on the shaft 21'. This unit comprises essentially a bell crank lever, the lower arm 34 of which is connected to the tension wire 35 of the brake linkage and the upper arm 36 which is adapted to contact the track 5 to retard or arrest the movement of the track. The upper surface of the arm 36 is curved or cam-shaped to apply a controlled braking pressure and is V-shaped in cross-section to conform to the cross-sectional shape of the rubber track 5.

Figure 6:
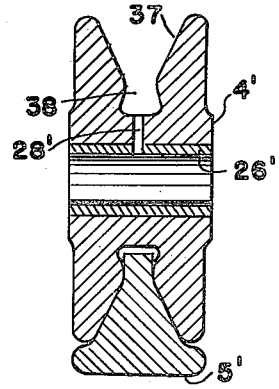
Fig. 6 is an enlarged cross-sectional detail of a modified design of guide roller and the cooperative belt or track.

In Fig. 6 there is shown a modified design of a guide roller which may be used in lieu of that shown in Fig. 2. This comprises a roller 4' with its associated bushing 26' and oil duct 28'. In this construction a groove for the track 5' is not a simple V-shape, but comprises essentially a tapered groove section 37 which merges into a slightly tapered groove 38 into which the track 5' fits. The sides of the track 5' which fit into the tapered groove 38 will be parallel with a width equal to the narrowest point between groove sections 37 and 38. With this design of flexible belt and pulley there is less danger of the belt riding out of the groove especially on turns because the edge furnished between 37 and 38 will tend to dig into the track and resist a tendency to ride out of the groove. Obviously, other cross-sectional designs of the track and groove may be utilized. When such different designs are employed it will be understood that the belt contacting surface of the brake lever should be conformed thereto.

The brake lever 8 may conveniently be approximately of the same width as roller 3 so that it is readily mounted within this side member 16 and 17 of the journal frame. As shown in Fig. 2, a leaf spring 39 may be mounted at one end between the chassis frame flanges 11 and 12 and at its other end contacts the brake lever flange to limit or fix the release movement of the brake lever, and to also insure positive retraction of the brake.

The forward unit of the running gear is substantially the same as that at the rear end and includes the upper roller 3 and lower roller 4 which rollers are mounted for rotation between the parallel arms 16 and 17 of the journal frame. The upper roller is supported in the side flanges of the longitudinal beam 1 by means of the axle 21 as previously described. The journal frame contacts the springs 29 and 30 which are resiliently compressed to absorb the running shocks. As will be observed, whereas the middle and rear running gear units are provided with the forward guard extensions 40, such extension is not formed on the forward unit.

At the forward end of the vehicle bumper 41 is provided. This preferably comprises a simple stamping of a light weight alloy of any suitable design such as the generally streamline form shown. The bumper may be perforated at intervals to reduce its weight. The bumper member is wide enough to protect steering levers 6 and 7 and is rigidly secured to the longitudinal frame member 1 by any suitable means such as by rivets, bolts and nuts, spot welds or the like, indicated diagrammatically at 42. The bumper is provided with the integral or extension arm 43. This preferably is formed with a strengthening rib 44 and is apertured at its rear end to receive the pivot 45 of the brake linkage.

The brake structure which is employed preferably embodies a brake lever on each side of the vehicle so designed as to provide complete control of the vehicle whether ridden in a sitting or a prone position. Each such lever is independently operable to retard the track on one side of the vehicle to direct or steer the sled. As will be seen, the levers may be operated simultaneously to decelerate or stop the vehicle without diverting it from a given course or direction. In Figs. 1 and 2 there is shown a simplified form of such brake structure. It will be observed that the units on each side of the sled are identical. As depicted in the drawings the brake levers 6 and 7 are arranged for pivotal movement in a horizontal plane about the pivot pins 6' and 7'. The outer portions of the levers are curved to afford a convenient hand grip and to serve as a non-slip pedal for foot operation. As shown, the outer end of each lever projects through elongated slots 46 in the side flange 11 of the longitudinal frame members 1. The top surface, to be described, may be cut away as shown at 47 (Fig. 1) to provide a foot rest which the rider may use instead of the levers while riding in the sitting position.

The inner ends of the levers 6 and 7 are offset at 48 and 49 respectively and such offset portions carry the pins 50 and 51. The brake rod 35 is formed with a clevis 52 which encompasses the pin 50 and forms with the latter a simple type of overrunning connection. The brake rod 35 is also provided with the stop lug 53 integrally attached thereto. This lug is formed with the eye 54 through which the tension rod 57 freely passes.

As is shown more particularly in Fig. 1, a pair of levers 55 and 56 are pivotally mounted for independent movement on the pivot pin 45. The lever 56 is connected to the draw rod 57 which passes loosely through the ring 54 of the stop lug 53. The end of rod 57 is offset and is formed with the ring 58. The lever 55, as will be noted, is associated with the brake rod 35 on the opposite side of the vehicle in an identical manner. The upper end of lever 56, as viewed in Fig. 1, is adapted to abut pin 51 on brake lever 7. Similarly, the upper end of lever 55 is adapted to abut the pin 50 on the brake lever 6.

It will be appreciated from this description that a brake lever on either side of the vehicle may be moved forwardly or rearwardly of the center or neutral position shown to actuate the brake shoe 36 on a chosen side of the vehicle. For example, if the lever 6 is moved in the direction of the arrow A the brake shoe 36 on the left hand side of the vehicle is actuated while the shoe on the opposite side is unaffected. In such movement the rod 35 on the left side of the vehicle is moved forwardly to apply the shoe 36. During such movement the lever 55 rides freely and hence is unaffected. Similarly, due to the overrunning connection provided by the ring 54, this latter rides forwardly on rod 57 and hence lever 56 remains at rest. This is to say that during such brake application on one side the brake linkage on the other side is not affected.

Conversely, when the lever 6 for example, is moved in the direction of arrow B the brake on the opposite or right side of the vehicle is applied without actuating the brake linkage on the opposite or left side. During such forward movement of lever 6 the clevis 52 rides loosely on the pin 50 and the brake linkage on the left side of the vehicle is therefore inoperative. Such movement, however, swings the lever 55 in a counter-clockwise direction, as viewed in Fig. 1, and draws the associated connected tension rod 35 forwardly. Since in such movement the ring 58 abuts the lug 53 the rod 35 is consequently moved forwardly to apply the brake 36 on such right side. During such forward movement of the rod 35 the clevis 52 rides freely over pin 51 leaving the levers 7 and 56 unaffected.

The vehicle similarly may be steered in a similar manner by the right hand lever 7. Thus, when the lever 7 is moved to the rear or in the direction of arrow A' the brake on the right side is applied independently of the brake on the opposite side and when the lever is moved in the direction of arrow B' the brake on the opposite or left side is applied without affecting the brake on the opposite side.

As previously explained, the vehicle may be decelerated by simultaneously applying the brakes on each side. This may be done by simultaneously moving levers 6 and 7 either toward the rear or toward the front of the sled. The degree or extent of brake application will, of course, determine the rate of deceleration of the vehicle.

Since the chassis of the vehicle is constructed of metal it is desirable to provide a non-metallic top covering so that it may not become uncomfortably hot or cold. Such a cover may be constructed of suitable materials such as hardwood, plastic sheets and the like. As shown, this may comprise a series of sheets 60, 61 and 62 of suitable material which are attached to the longitudinal frame members 1 and cross beams 2 in any suitable manner. These are independently mounted and are spaced apart slightly to permit slight weaving of the under frame. Preferably, as shown, the top surfacing extends the full length of the vehicle and the forward edges extend under the bumper to provide a full flush top surface. This provides maximum comfort coupled with optimum safety since all the operating mechanism is housed below the surface and is thus inaccessible to the child using the vehicle.

It is to be observed that, in order to insure smooth operation, a minimum of three sets of idlers on each side of the vehicle is required. If only two sets of idlers were utilized the rider would be subjected to considerable jolting in passing over small ditches or obstructions. Obviously, the vehicle can be elongated to any desired extent and more than three sets of idlers can be provided on each side of such elongated models.

It will be appreciated that a vehicle of the type described presents manifold advantages. In the construction all parts excepting the axles, brake wires, top covering and the endless belt or track are fabricated of light high strength metals such as aluminum and magnesium alloys. These parts may be extrusions, rolled stock, or sand, die or permanent mold castings. All moving parts are adequately housed or guarded so as to insure maximum protection against injury to the child using the vehicle. The running gear of the car comprises a series of independently, resiliently mounted units thus permitting smooth running over uneven surfaces. The simple effective steering and braking mechanism insures complete directional and speed control even on steep grades thus providing the maximum safety coupled with an extensive latitude of use on a pleasing variety of terrain.

While a preferred modification of the invention has been described it is to be understood that this is given to exemplify the underlying principles involved and not as limiting the useful scope of the invention to the particular illustrative embodiment.

I claim:

A children's vehicle comprising a frame provided with a substantially flush body-engaging surface, running gear supported on the frame, said running gear including a freely movable ground-engaging track positioned on each side of the vehicle and extending substantially the full length of the vehicle, a brake unit associated with each track, a pair of brake levers mounted for pivotal movement in a horizontal plane and positioned near the forward end of the vehicle, linkage connecting the brake levers and brake units and including overrunning connection connecting each lever with each brake unit whereby each lever may be actuated to optionally apply either brake unit frictionally to direct the vehicle and the levers may be simultaneously actuated to apply both brake units to decelerate the vehicle.

CLETUS L. JASPER.

REFERENCES CITED

The following references are of record in the file of this patent:

UNITED STATES PATENTS

| Number | Name | Date |
|---|---|---|
| 64,134 | Nunn | Apr. 23, 1867 |
| 578,932 | Justice | Mar. 16, 1897 |
| 1,097,044 | Preble | May 19, 1914 |
| 1,194,269 | Best | Aug. 8, 1916 |
| 1,253,319 | White | Jan. 15, 1918 |
| 1,307,092 | Fuchs | June 17, 1919 |
| 1,407,964 | Turnbull | Feb. 28, 1922 |
| 1,890,728 | Fundom | Dec. 13, 1932 |
| 2,312,071 | Broadwater | Feb. 23, 1943 |
| 2,389,289 | Armington | Nov. 20, 1945 |
| 2,422,254 | Peronti | June 17, 1947 |

FOREIGN PATENTS

| Number | Country | Date |
|---|---|---|
| 192,624 | Great Britain | Feb. 8, 1923 |